(12) United States Patent
Gan

(10) Patent No.: US 9,018,282 B2
(45) Date of Patent: Apr. 28, 2015

(54) HOMOGENOUS DISPENSING PROCESS FOR AN EPOXY-COMPOSITION WITH HIGH FILLER CONTENT

(75) Inventor: Yoke Ai Gan, Yokohama (JP)

(73) Assignee: Henkel AG & Co. KGaA, Duesseldorf (DE)

( * ) Notice: Subject to any disclaimer, the term of this patent is extended or adjusted under 35 U.S.C. 154(b) by 218 days.

(21) Appl. No.: 13/444,973

(22) Filed: Apr. 12, 2012

(65) Prior Publication Data

US 2012/0202922 A1 Aug. 9, 2012

Related U.S. Application Data

(63) Continuation of application No. PCT/EP2010/065306, filed on Oct. 13, 2010.

(30) Foreign Application Priority Data

Oct. 14, 2009 (WO) .................. PCT/EP2009/063424

(51) Int. Cl.
*C08G 63/00* (2006.01)
*C08J 3/00* (2006.01)
*C08G 59/18* (2006.01)
*C08L 63/00* (2006.01)

(52) U.S. Cl.
CPC .................. *C08J 3/005* (2013.01); *C08G 59/18* (2013.01); *C08L 63/00* (2013.01); *C08J 2363/00* (2013.01)

(58) Field of Classification Search
CPC ..... B01F 3/1207; B01F 3/1214; B01F 3/1221
USPC .................. 523/427, 400, 458, 468, 466, 445
See application file for complete search history.

(56) References Cited

U.S. PATENT DOCUMENTS

| 5,904,888 A | * | 5/1999 | Hayes et al. | 264/331.12 |
| 6,248,204 B1 | | 6/2001 | Schuft | |
| 2008/0213680 A1 | * | 9/2008 | Nagai | 430/39 |
| 2011/0027591 A1 | | 2/2011 | Braun et al. | |

FOREIGN PATENT DOCUMENTS

| EP | 0359709 A2 | 3/1990 | |
| EP | 0835910 A1 | 4/1998 | |
| EP | 1905805 A1 * | 4/2008 | ........... C09D 163/00 |
| JP | H11507978 A | 7/1999 | |
| JP | 2009057575 A | 3/2009 | |
| JP | 2009091510 A | 4/2009 | |

OTHER PUBLICATIONS

International Search Report PCT/EP2010/065306.*

* cited by examiner

*Primary Examiner* — Megan McCulley
(74) *Attorney, Agent, or Firm* — Mary K. Cameron

(57) ABSTRACT

The present invention relates to a process for the production of a ready-to-use epoxy composition having a filler content of at least 55 vol.-%, relative to the complete ready-to-use epoxy composition, which comprises:
providing a liquid A, which comprises at least one epoxy resin,
providing a liquid B, which comprises at least one curing agent,
providing a solid component C, which comprises at least one filler,
wherein in a first step one of the liquids A or B is filled in a mixing container,
in a second step the solid component C is deposited on top of the liquid in the mixing container,
in a third step the remaining liquid A or B is deposited on top of the solid component C, and
in a fourth step the components are mixed to obtain the ready-to-use epoxy composition.

20 Claims, No Drawings

HOMOGENOUS DISPENSING PROCESS FOR AN EPOXY-COMPOSITION WITH HIGH FILLER CONTENT

CROSS-REFERENCE TO RELATED APPLICATIONS

This application is a continuation of International Patent Application No. PCT/EP2010/065306 filed Oct. 13, 2010, which claims priority to International Patent Application No. PCT/EP2009/063424 filed Oct. 14, 2009, the contents of both of which are incorporated herein by reference.

The present invention relates to a process for the production of a homogenous high filler-containing epoxy composition from three separately assembled components, a kit-of-parts comprising these three components as well as the ready-to-use epoxy composition which is obtained by the inventive process.

Epoxy adhesives are versatile in that they can be used to bond a variety of substrates effectively and can be formulated to cure at either room temperature or elevated temperatures. Although generally characterized as being brittle, they can be formulated to be more flexible without loss of tensile strength. In the general industrial market, epoxy adhesives are used with furniture, appliances etc. In addition, structural bonding applications in building or highway construction rely on performance characteristics of epoxy adhesives. In the automotive market, epoxy adhesives are used in subcomponent (engine and none-engine) assemblies. Epoxies can also be used in the assembly of missiles, composite repair etc. of aerospace applications. Epoxy adhesives can be 1-K (component) type or 2-K (component) type depending on the application requirements. For 2-K (component) epoxies, automatic static or dynamic dispensing equipments are commonly used for mixing the adhesive just prior to application.

Most of the conventional epoxy resin compositions are two part compositions comprising the main part and the curing agent. Fillers are often admixed to the epoxy compositions during the production at any time to improvise the properties to meet the application requirements. Generally, the fillers' contents are low and do not exceed a content of about 50 vol.-% relative to the composition. Homogeneous ready-to-use epoxy compositions with higher filler content are difficult to obtain by the conventional 2-component techniques, because a disadvantage during the production process is the tendency of the fillers to agglomerate or to sediment. Further, it is also difficult to ensure a homogeneous mixing and dispensing of highly filled epoxy products by the conventional automatic static or dynamic dispensing equipments. Fillers would accumulate, agglomerate and block at the mixing area of static or dynamic mixing components.

The object of the present invention is therefore to provide a process to produce an epoxy composition with high filler content and which does not show the above mentioned problems such as agglomeration and sedimentation during the production process.

Surprisingly, with the method according to the present invention homogenous ready-to-use epoxy compositions with high filler content can be obtained easily. Accordingly, the present invention provides a process for the production of a ready-to-use epoxy composition having a filler content of at least 55 vol.-%, relative to the complete ready-to-use epoxy composition, which comprises:
providing a liquid A, which comprises at least an epoxy resin,
providing a liquid B, which comprises at least a curing agent,
providing a solid component C, which comprises at least one filler,
wherein in a first step one of the liquids A or B is filled in a mixing container,
in a second step the solid component C is deposited on top of the liquid phase in the mixing container,
in a third step the remaining liquid A or B is deposited on top of the solid component C, and
in a fourth step the components are mixed to obtain the ready-to-use epoxy composition.

The term "ready-to-use epoxy composition" generally means a reactive mixture which is obtained by mixing the first component, comprising at least one epoxy resin, the second component, comprising at least a curing agent, and the third component, comprising at least one filler, wherein the curing agent is selected such that it is able to react with the epoxy resin at 20° C. conditions without the need of the addition of any kind of activating energy.

The terms "solid" and "liquid" as used in the present invention refer to the physical conditions of the components at a temperature of 20° C. and ambient pressure (1013 mbar).

The term "deposited on top of" as used in the present invention means that the phases are layered within the mixing container on top of each other with distinct phase boarders. It is preferred that almost no intermediate mixing occurs at the phase boarders. At most the intermediate mixing at the phase separation lines takes place only at such a low degree that no substantial contact between the bottom and the top layer arises (no contact between liquids A and B) due to the intermediate solid component C, which makes up at least 55 vol.-% of the total ready-to-use epoxy composition. It can be preferred that no more than 5 weight-%, preferably no more than 3 weight-%, most preferably no more than 0,5 weight-%, of liquid A are admixed with liquid B and/or no more than 5 weight-%, preferably no more than 3 weight-%, most preferably no more than 0.5 weight-%, of liquid B are admixed with liquid A during the filling process (prior to the start of mixing step 4).

This inventive procedure overcomes the existing problem to incorporate high filler contents above 55 vol.-% into the de-aerated mixtures of conventional epoxy compositions homogenously. In conventional 2K-systems, sedimentation of the fillers during the storage times as well as during the dispensing process are regularly observed. Furthermore any mixing ratios of liquids A and B and solid component C can be freely chosen and consistently controlled by precise weighing of these pre-mixtures. The process according to the present invention resolves the problems in the production process of ready-to-use epoxy compositions, helps to simplify it, increases time and cost savings as well as production yields of homogenous products.

More preferably the composition exhibits a filler content of at least 60 vol.-%, most preferably of at least 65 vol.-%, relative to the complete ready-to-use epoxy composition. Preferably the epoxy composition exhibits a filler content below 70 vol.-% relative to the complete ready-to-use epoxy composition, depending on the application requirements like very low volume shrinkage application, potting etc.

Furthermore it has been found that best effects with regard to separation of the phases prior to mixing as well as with regard of homogeneity of the resulting ready-to-use epoxy composition could be obtained if the liquid A and/or the liquid B exhibit viscosities from 1 000 to 20 000 mPas, preferably from 2 000 to 15 000 mPas, more preferably from 3 000 to 10 000 mPas (measured at 22° C. with a Brookfield viscosimeter type RV-T with spindle 6 at a rotation speed of 20 rpm). In a particular preferred embodiment both liquid A and liquid B exhibit a viscosity within the aforementioned ranges.

Preferably, the process according to the present invention is characterized in that liquid A and/or liquid B are de-aerated before their deposition in the mixing container. Further preferably, the mixing procedure during the production process is accomplished under vacuum at a temperature from 20° C. to 60° C. The temperature should not exceed 60° C. as the epoxy mixture would start to cure. The temperature of the mixture may increase during the mixing process due to friction of fillers, thus the mixing conditions are preferably controlled by cooling means during the process to assure that the temperature of the mixture does not exceed 60° C.

In a preferred embodiment of the present invention the mixing container is equipped with a mixing unit which has a rotation function. The term "rotation function" means that the mixing container is rotated around an axis which is perpendicular to the plane of the inlet opening of the mixing container. Furthermore it is preferred if the mixing container is equipped with an additional revolution function. The term "revolution function" means that the rotation axis of the mixing container is oriented in an angle to the plumb line above 15°, preferably above 30°, and a revolution motion of the entire system around the plumb line as revolution axis is superimposed. The rotation speed and revolution speed of the equipment depend on the weight and size of the container filled with the epoxy compositions. The person skilled in the art has the knowledge to adjust these parameters.

Preferably the mixing process is accomplished with equipment having both rotation and revolution function and which is for instance available from the companies Thinky Co. Ltd and EME Co. Ltd. (like UFO-5).

Since the curing and hardening process of the ready-to-use epoxy composition immediately starts when the liquids A and B get in contact with each other, it is preferred that the resulting mixture is rapidly dispensed from the mixing container and applied. It can be particularly preferred if the dispensing time (measured from the end of the mixing time until the mixing container is exhausted) is less than 15 minutes, more preferably less than 10 minutes, most preferably less than 5 minutes. It is a further advantage of the present invention that the process can be rather simply semi-automated. In such a semi-automated process the various materials (liquid A, liquid B, solid filler phases) can be weighed automatically into the dispensable mixing container.

The solid component C which is used in the inventive process contains at least one filler. The term "filler" generally refers to additives which increase the volume and/or the weight of compositions, but also have an impact on the technical properties of the compositions.

The fillers are selected according to their impact of the technical properties required for the resulting adhesive. It can be preferred to incorporate fillers showing good magnetic properties. The resulting compositions can for example be used for applications in automotive DC-AC transformers. Furthermore it can be preferred to incorporate—additionally or instead of the magnetic fillers—fillers showing good thermal conductivity for applications such as casting materials for car inverter.

In a preferred embodiment of the present invention the component C contains at least one filler selected from the ferrites.

Preferred ferrites according to the present invention are selected from the group consisting of ferrites of the general formula $$M^{II}Fe^{III}_2O_4 \text{ or } M^{II}O*Fe_2O_3,$$

wherein M is selected from the group consisting of Mn, Co, Ni, Mg, Ca, Cu, Zn, Y, Sn, Cd, Sr, Ti, Cr, Mo and V.

The metal mixed oxides used in accordance with the invention are preferably double oxides of the spinel type. Ferrites with the formula $M^{II}Fe^{III}_2O_4$ where $M^{II}$ is a metal component comprising at least two different divalent metals, are preferably used. One of the divalent metals is selected from Mn, Co, Ni, Mg, Ca, Cu, Zn, Y, Sn, Cd, Sr, Ti, Cr, Mo and V and more particularly from Mn, Co and Ni. At least one other is preferably selected from Zn and Cd.

In one particular preferred embodiment, the metal mixed oxide is selected from ferrites with the general formula $(M^a_{1-x-y}M^b_xFe_y)^{II}Fe^{III}_2O_4$, wherein $M^a$ and $M^b$ can be metals selected independently from Mn, Co, Ni, Mg, Ca, Cu, Zn, Y, Cd and V, more particularly Mn, Co, Ni, Zn and Cd, x is a number from 0.05 to 0.95 and y is a number from 0 to 0.95 and the sum of x and y is at most 1, and mixtures thereof.

In an other preferred embodiment of the present invention the solid component C contains at least one filler selected from aluminum oxide, magnesium oxide, zinc oxide, titanium oxide, silicon oxide, aluminum hydroxide, magnesium hydroxide, silicon nitride, aluminum nitride, boron nitride, silicon carbide, aluminum, copper, graphite, nickel or silver or mixtures thereof.

The fillers can be selected according to the demands made on the adhesive. In one embodiment of the present invention it can be preferred to combine at least one ferrite with at least one metal powder, especially aluminium powder, as filler components. The resulting adhesives with high filler content combine good magnetic properties with a high thermal conductivity. In this embodiment it is preferred when the weight ratio of the ferrite to the metal powder is between 100:1 and 20:1, more preferably between 80:1 and 30:1. In the general process of the present invention it is preferred that the different fillers are mixed prior to their addition to the mixing container. In this specific embodiment however it can be further preferred if the different filler components are added separately to the mixing container; it can be even more preferred if first the metal powder and than the ferrite is added to the mixing container.

In a preferred embodiment of the present invention the solid component C consists of particles having an average particle size from 0.5 to 1000 micrometer. In a preferred embodiment the fillers have an average particle size from 3 to 500 micrometer, more preferably from 5 to 300 micrometer. The selection of filler particles exhibiting these dimensions in size reduces the risk of intermixing between the different phases layered within the mixing container and accounts for a better separation of the liquid phases A and B prior to mixing.

The term "average particle size" refers to the average size of the longest dimension in space of the filler particles which is obtained by adding the values of n individual measurements by transmission electron microscopy and then dividing the total by n. The average particle size is determined over all fillers present, that means it is calculated over the mixture of different filler components.

The amount of fillers used depends on the application requirements.

The liquid A used within the process of the present invention comprises at least one epoxy resin.

As epoxy resin, various known resins can be used, for example, bisphenol A type epoxy resin, bisphenol F type epoxy resin, bisphenol AD type epoxy resin, bisphenol S type epoxy resin, the corresponding hydrogenated epoxy resins, glycidyl ester type epoxy resin, glycidylamine type epoxy resin, alicyclic epoxy resin, novolac type epoxy resin, such as phenol-novolac type epoxy resin, cresol-novolac type epoxy resin, urethane-modified epoxy resin obtained by terminal epoxidization of a urethane prepolymer, fluorinated epoxy resin, polybutadiene- or NBR-containing rubber-modified epoxy resin, tetrabromobisphenol A glycidyl ether and other flame-retarded epoxy resin, and the like.

Further resins, which can be used, for example are epoxidized products of dicyclopentadiene-modified phenol resins, which are obtained through the reaction of dicyclopentadiene with various phenol types, epoxidized products of 2,2',6,6'-tetramethylbiphenol, aromatic epoxy resins, such as epoxy resins with nahphatline scaffolds and fluorine epoxy resins types, aliphatic epoxy resins, such as neopentylglycole-diglycidylether and 1,6-Hexandiole-diglycidylether, alicyclic epoxy resin types, such as 3,4-epoxycyclohexylmethyl-3,4-epoxycyclohexancarboxylate and bis(3,4-epoxycyclohexyl) adipate, and epoxy resins types with one hetero ring like triglycidylisocyanurate.

Also preferably are the epoxy resins which are obtained from bisphenol A and epichlorhydrin, from phenol and formaldehyd (novolac-resins) and epichlorhydrin, glycidyl ester, and from epichlorhydrin and p-aminophenol.

Further polyphenoles, which reacts with epichlorhydrin (or epibromhydrine) to suitable epoxy resin-prepolymers are: resorcin, 1,2-dihydroxybenzol, hydrochinone, bis(4-hydroxyphenyl)-1,1-isobutane, 4,4'-dihydroxybenzophenone, bis (4-hydroxyphenyl)-1,1-ethane and 1,5-hydroxynaphthaline. Further suitable epoxy resin-prepolymers are polyglycidylethers of polyalkohols or diamines. Such polyglycidylethers derive from polyalcohols like ethylenglycole, diethylenglycold, triethylenglycole, 1,2-propylenglycole, 1,4-butylenglycole, triethylenglycole, 1,5-pentandiole, 1,6-hexandiole or trimethylolpropane.

Further, preferred epoxy resins, which are commercial available and which can be used herein are octadecylenoxide, epichlorhydrine, styroloxide, vinylcyclohexenoxide, glycidole, glycidylmethacrylate, diglycidylethers of bisphenol A (such as the ones which are available under the trademarks "Epon 828", "Epon 825", "Epon 1004" and "Epon 1010" from Hexion Specialty Chemicals Inc., "DER-331", "DER-332", "DER-334", "DER-732" and "DER736" from Dow Chemical Co.), vinylcyclohexendioxide, 3,4-epoxycyclohexylmethyl-3,4-epoxycyclohexene-carboxylate, 3,4-epoxy-6-methylcyclohexylmethyl-3,4-epoxy-6-methyl-cyclohexencarboxylaet, bis(3,4-epoxy-6-methylcyclohexylmethyl)adipate, bis(2,3-epoxycyclopentyl)ether, aliphatic, polypropylenglycole-modified epoxies, dipentendioxide, epoxidized polybutadiene (e.g. Krasol Products from Sartomer), silicon resins with epoxy functions, flame retardant epoxy resins (e.g. "DER-580" from Dow Chemical Co.), 1,4-butandiole-diglycidylethers of phenolformaldehyd-Novolacs (e.g. "DEN-431" and "DEN-438" from Dow Chemical Co.), and resorcin-diglycidylethers (e.g. "Kopoxite" from Koppers Company Inc.), bis(3,4-epoxycyclohexyl)adipate, 2-(3,4-epoxycyclohexyl-5,5-spiro-3,4-epoxy)cyclohexan-meta-dioxane, vinylcyclohexenmonoxide, 1,2-epoxyhexadecane, alkylglycidilethers, such as, e-g- C8-C10-alkyle-glycidylether (e.g. "HELOXY Modifier 7" from Hexion Specialty Chemicals Inc.), C12-C14-alkyleglycidylethers (e.g. "HELOXY Modifier 8" from Hexion Specialty Chemicals Inc.), butylglycidylethers (z.B. "HELOXY Modifier 61" from Hexion Specialty Chemicals Inc.), cresylglycidylethers (z.B. "HELOXY Modifier 62" from Hexion Specialty Chemicals Inc.), p-tert.-butylphenylglycidylethers (e.g. "HELOXY Modifier 65" from Hexion Specialty Chemicals Inc.), polyfunctional glycidylethers, such as, e.g. diglycidylethers of 1,4-butandiole (e.g. "HELOXY Modifier 67" from Hexion Specialty Chemicals Inc.), diglycidylethers of neopentylglycole (e.g. "HELOXY Modifier 68" from Hexion Specialty Chemicals Inc.), diglycidylethers of cyclohexanedimethanol (e.g. "HELOXY Modifier 107" from Hexion Specialty Chemicals Inc.), trim-ethylolethane-triglycidilethesr (e.g. "HELOXY Modifier 44" from Hexion Specialty Chemicals Inc.), trimethylolpropane-triglycidylethers (z.B. "HELOXY Modifier 48" from Hexion Specialty Chemicals Inc.), polyglycidylethers of aliphatic polyols (e.g. "HELOXY Modifier 84" from Hexion Specialty Chemicals Inc.), polyglycoldiepoxide (e.g. "HELOXY Modifier 32" from Hexion Specialty Chemicals Inc.), bisphenol F-epoxide (e.g. "EPN-1138" or GY-281" from Huntsman Int. LLC), 9,9-bis-4-(2,3-epoxypropoxy)-phenylfluorenon (e.g. "Epon 1079" from Hexion Specialty Chemicals Inc.).

Further preferred commercial available products which can be used herein are Araldite™ 6010, Araldit™ GY-281™, Araldit™ ECN-1273, Araldit™ ECN-1280, Araldit™ MY-720, RD-2 von der Huntsman Int. LLC; DEN™ 432, DEN™ 438, DEN™ 485 from Dow Chemical Co., Epon™ 812, 826, 830, 834, 836, 871, 872, 1001, 1031, and the like from Hexion Specialty Chemicals Inc. and HPT™ 1071, HPT™ 1079 from Hexion Specialty Chemicals Inc., Epi-Rez™ 5132 from Hexion Specialty Chemicals Inc., ESCN-001 from Sumitomo Chemical, Quatrex 5010 from Dow Chemical Co., RE 305S von Nippon Kayaku, Epiclon™ N673 from DaiNipon Ink Chemistry or Epicote™ 152 from Hexion Specialty Chemicals Inc.

In a preferred embodiment of the present invention surprisingly good technical properties have been obtained for ready-to-use epoxy compositions containing more than one type of epoxy resin.

Preferably liquid A therefore comprises at least two types of epoxy resin of different molecular weight and/or different functionalities.

The liquid B which is used within the process of the present invention comprises at least one curing agent. The curing agent is selected preferably from compounds which react with the reactive epoxy resins without the addition of any type of activating energy.

Suitable curing agents may be aliphatic amines, cycloaliphatic amines, aromatic amines, polyaminoamides, imidazoles, epoxy-modified amines, Mannich-modified amines, Michael addition-modified amines, ketimines, acid anhydrides, among others. These curing agents can be used each independently or in a combination of two or more species.

In another embodiment of the inventive process it is preferred when the liquid A and/or the liquid B contain at least one further additive. The further additive may be selected from thickening agents, pigments, plasticizers, reinforcing agents and the like.

The plasticizers may be phthalic acid esters, non-aromatic dibasic acid esters and phosphoric esters, among others. As the plasticizer of the comparatively high molecular weight type, polyesters of dibasic acids with a dihydric alcohol, polypropylene glycol and its derivatives, and polystyrene, among others, can be mentioned. These plasticizers can be used each independently or in a combination of two or more species.

Preferred reinforcing agents can be selected from coal tar, bitumen, textile fibers, glass fibers, asbestos fibers, boron fibers, carbon fibers, mineral silicates, mica, powdered quartz, hydrated aluminum oxide, bentonite, wollastonite, kaolin, silica, aerogel and/or elastomers.

A further aspect of the present invention is related to a sales packet which is a kit-of-parts comprising
a separately assembled liquid A, which comprises at least one epoxy resin, a separately assembled liquid B, which comprises at least one curing agent, and a separately assembled solid component C, which comprises at least one filler.

In this aspect of the present invention it can be preferred that the solid component C consists of particles having an average particle size from 0.5 to 1000 micrometer.

Further, it can be preferred that the kit of parts is suited to be used in a process according to the present invention to produce of a ready-to-use epoxy composition having a filler content of at least 55 vol.-%, relative to the entire ready-to-use-composition.

Concerning the details of the preferred embodiments of this aspect of the present invention it is explicitly referred to the details disclosed above with regard to the inventive process which can be applied mutatis mutandis.

It is one advantage of the inventive kit that the different parts can be packaged in large amounts and can be weighed in the needed ratios in the moment of use according to the present needs.

Still another object of the present invention is a ready-to-use epoxy-composition which has been prepared according to the inventive process.

Concerning the details of the preferred embodiments of this object of the present invention it is explicitly referred to the details disclosed above with regard to the inventive process which can be applied mutatis mutandis.

The invention is further illustrated by the following examples.

EXAMPLES

The following compositions have been prepared:

Phase A

| Components | Liquid A' Invention [g] | Liquid A Comparison [g] |
|---|---|---|
| Neopentylglycol Diglycidylether | 2.25 | 2.25 |
| Epoxy phenol Novolac | 0.10 | 0.10 |
| Bisphenol A | 1.70 | 1.70 |
| Bisphenol F | 2.30 | 2.30 |
| NBR modified epoxy/Bisphenol A mixture | 0.18 | 0.18 |
| Aerosil silica | 0.09 | 0.09 |
| Solvent Red24 | 0.05 | 0.05 |
| Aluminium Powder (approx. 5 micron) | — | 1.62 |
| Ferrite ($Co^{II}O * Fe_2O_3$; <500 micron) | — | 81.71 |
| Total | 6.67 | 90.00 |

Phase B

| Components | Liquid B' Invention [g] | Liquid B Comparison [g] |
|---|---|---|
| Modified aliphatic amine | 2.09 | 2.09 |
| Aerosil silica | 0.05 | 0.05 |
| Aluminium Powder (approx. 5 micron) | — | 0.78 |
| Ferrite ($Co^{II}O * Fe_2O_3$; <500 micron) | — | 27.08 |
| Total | 2.14 | 30.00 |

Phase C

| Components | Phase C Invention [g] |
|---|---|
| Aluminium Powder (approx. 5 micron) | 2.40 |
| Ferrite ($Co^{II}O * Fe_2O_3$; <500 micron) | 108.79 |
| Total | 111.19 |

Calculation of the Volume Ratios

| Components | Amount [g] | Volume [ml] | Volume ratio [vol %] |
|---|---|---|---|
| Phase A (Liquid A') | 5.56 [a] | 4.83 | 25.36 |
| Phase B (Liquid B') | 1.78 [a] | 1.78 | 9.34 |
| Phase C: | | | |
| Aluminium powder | 2.00 [a] | 0.74 | 3.88 |
| Ferrite | 90.66 [a] | 11.70 | 61.42 |
| Total | 100.00 | 19.05 | 100.00 |

[a] based on a total of 100 g for the mixture of A' + B' + C
Density of Liquid A': 1.15 g/ml
Density of Liquid B': 1.00 g/ml
Density of Aluminium: 2.70 g/ml
Density of Ferrite: 7.75 g/ml Comparative Example The comparative epoxy composition has been dispensed with
a) a 2K cartridge system with static mixer and
b) a 2K separate dispending tank with dynamic mixer Alternative a)

When the comparative liquids A and B with high filler content were filled in the cartridges bubbles were easily trapped and during storage sedimentation of fillers occurred. However, it is difficult to stir or to vacuum the liquids within the cartridges in order to remove the bubbles of the material.

Since the material needs to have good flow properties for dispensing and mixing, the materials had to be heated at around 60° C. within the cartridges and/or the mixing unit. The heating enhances sedimentation causing an inhomogeneous mixture being dispensed.

Due to the high filler content the mixture has a high resistance at the static mixer and great pressure is needed to dispense the mixture form the cartridge system. A further disadvantage of using a 2K cartridge system is the restrained ratio of liquid A to liquid B.

Alternative b)

Heating the dispending tank at around 60° C. and also keeping the other parts of the system at elevated temperature is necessary to ensure good flow for application. However, the heating enhances sedimentation of the fillers. By stirring the materials bubbles were trapped and there was still some sedimentation which caused dispensing of an inhomogeneous mixture.

The ratio of liquid A and B cannot be easily controlled, which will lead to inconsistencies.

Inventive Process

Inventive liquids A' and B' without fillers were de-aerated and liquid B' was filled first in a dispensable container equipped with devices having both rotation and revolution function. Liquid B' was then covered with ferrite fillers and/or other fillers (Phase C). After that liquid A' was added carefully. It was made sure that liquid A' and liquid B' were not in contact with each other. The layered components were then mixed and de-aerated for about 2 to 5 minutes. During this process, the mixture became rather hot due to friction of fillers, thus the mixing condition needed to be controlled (the temperature was controlled to not exceed 60° C. as the epoxy mixture would start to cure at this temperatures). The resulting mixture was then rapidly applied since curing proceeded.

Once mixed sedimentation was almost prevented by the increased viscosity (due to the slow curing which occurred when mixing liquid A' and B' together and due to further thermal curing).

The invention claimed is:

1. Process for the production of a ready-to-use epoxy composition having a filler content of at least 55 vol.-%, relative to the complete ready-to-use epoxy composition, which comprises:
providing a liquid A, which comprises at least one epoxy resin,
providing a liquid B, which comprises at least one curing agent,
providing a solid component C, which comprises at least one filler selected from the group consisting of ferrites, aluminum oxide, magnesium oxide, zinc oxide, titanium oxide, silicon oxide, aluminum hydroxide, magnesium hydroxide, silicon nitride, aluminum nitride, boron nitride, silicon carbide, aluminum, copper, graphite, nickel and silver,
wherein in a first step one of the liquids A or B is filled in a mixing container,
in a second step the solid component C is deposited on top of the liquid in the mixing container,
in a third step the remaining liquid A or B is deposited on top of the solid component C, whereby liquid A, liquid B and solid composition C form phases which are layered on top of each other with distinct phase borders, the solid composition C phase being intermediate between the liquid A phase and the liquid B phase, and
in a fourth step the components are mixed to obtain the ready-to-use epoxy composition.

2. The process according to claim 1, characterized in that liquid A and/or liquid B are de-aerated before their deposition in the mixing container.

3. The process according to claim 1, characterized in that the mixing procedure is accomplished under vacuum and/or at a temperature from 20° C. to 60° C.

4. The process according to claim 1, characterized in that the filler is selected from the group consisting of ferrites of the general formula $M^{II}Fe^{III}_2O_4$ or $M^{II}O*Fe_2O_3$,

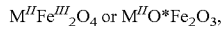

wherein M is selected from the group consisting of Mn, Co, Ni, Mg, Ca, Cu, Zn, Y, Sn, Cd, Sr, Ti, Cr, Mo and V.

5. The process according to claim 1, characterized in that the solid component C consists of particles having an average particle size from 0.5 to 1000 micrometer.

6. The process according to claim 1, characterized in that liquid A comprises at least two different types of epoxy resins.

7. The process according to claim 6, wherein the at least two different types of epoxy resin exhibit different molecular weights and/or different functionalities and/or different epoxy equivalent weights.

8. The process according to claim 1, characterized in that liquid A contains at least one further additive, selected from thickening agents, pigments, plasticizers and reinforcing agents.

9. The process according to claim 1, characterized in that liquid B contains at least one further additive, selected from thickening agents, pigments, plasticizers and reinforcing agents.

10. The process according to claim 1, wherein no more than 5 weight-% of liquid A is admixed with liquid B and/or no more than 5 weight-% of liquid B is admixed with liquid A prior to the start of the fourth step.

11. The process according to claim 1, wherein no more than 0.55 weight-% of liquid A is admixed with liquid B and/or no more than 0.5 weight-% of liquid B is admixed with liquid A prior to the start of the fourth step.

12. The process according to claim 1, wherein temperature is controlled during the fourth step by cooling means such that the temperature of the components does not exceed 60° C.

13. The process according to claim 1, wherein the mixing in the fourth step utilizes a device having rotation and/or revolution function.

14. The process according to claim 1, wherein the at least one filler comprises a combination of at least one ferrite and at least one metal powder.

15. The process according to claim 14, wherein the at least one ferrite and at least one metal powder are mixed to form the combination prior to adding solid component C to the mixing container.

16. The process according to claim 14, wherein the at least one ferrite and the at least one metal powder are present in a weight ratio of between 100:1 and 20:1 ferrite to metal powder.

17. The process according to claim 14, wherein the at least one metal powder is first added separately to the mixing container and then the at least one ferrite is added to the mixing container.

18. The process according to claim 1, wherein solid component C comprises two or more fillers and the two or more fillers are added separately to the mixing container.

19. The process according to claim 1, wherein liquid A and liquid B are each free of the at least one filler of solid component C.

20. Process for the production of a homogeneous ready-to-use epoxy composition having a filler content of at least 65 vol.-%, relative to the complete ready-to-use epoxy composition, which comprises:
providing a liquid A, which comprises at least one epoxy resin and exhibits a viscosity of from 1000 to 20,000 mPas as measured at 22° C. with a Brookfield viscometer type RV-T with spindle 6 at a rotation speed of 20 rpm,
providing a liquid B, which comprises at least one curing agent and exhibits a viscosity of from 1000 to 20,000 mPas as measured at 22° C. with a Brookfield viscometer type RV-T with spindle 6 at a rotation speed of 20 rpm,
providing a solid component C, which comprises at least one filler selected from the group consisting of ferrites, aluminum oxide, magnesium oxide, zinc oxide, titanium oxide, silicon oxide, aluminum hydroxide, magnesium hydroxide, silicon nitride, aluminum nitride, boron nitride, silicon carbide, aluminum, copper, graphite, nickel and silver,
wherein in a first step one of the liquids A or B is filled in a mixing container, in a second step the solid component C is deposited on top of the liquid in the mixing container, in a third step the remaining liquid A or B is deposited on top of the solid component C, whereby liquid A, liquid B and solid composition C form phases which are layered on top of each other with distinct phase borders, the solid composition C phase being intermediate between the liquid A phase and the liquid B phase, and in a fourth step the components are mixed to obtain the homogeneous ready-to-use epoxy composition.

* * * * *